March 21, 1967 K. W. HALLDEN 3,309,953
FLYING SHEAR OF VARIABLE CUT LENGTHS
Filed Aug. 4, 1965 3 Sheets-Sheet 1

INVENTOR
Karl W. Hallden
BY
Attorney.

INVENTOR
Karl W. Hallden
BY
Attorney

United States Patent Office 3,309,953
Patented Mar. 21, 1967

3,309,953
FLYING SHEAR OF VARIABLE CUT LENGTHS
Karl W. Hallden, Thomaston, Conn., assignor to The Hallden Machine Company, Thomaston, Conn., a corporation of Connecticut
Filed Aug. 4, 1965, Ser. No. 477,263
20 Claims. (Cl. 83—305)

This invention relates to stock-cutting devices in general, and to flying shears for cutting stock in motion in particular.

The present invention is concerned with flying shears that cut stock into variable lengths within a given range while the stock is continuously fed. These shears have a shear frame and a shear gate carrying companion shear blades, respectively, of which the gate is guided on the frame for movement with its blade into and from shearing relation with the other blade and is otherwise movable with the frame, and operating eccentrics for the frame and gate, respectively. In one type of shear, referred to as a "rod" shear for convenience, the shear frame is guided for rectilinear, generally horizontal, movement, and the same is connected with its operating eccentric by an arm which intermediate its ends is turnably mounted on this eccentric and has at its opposite ends a vertically floatable pivot connection with the shear frame and a pivot connection with a follower strap on another eccentric, respectively. Thus, on the drive of this operating eccentric, the same will impart to the arm compound up-and-down motion and back-and-forth oscillatory motion about its pivot connection with the follower strap on the other eccentric which is hereafter referred to as the "synchronizing" eccentric, with the oscillatory motion of the arm being transmitted to the shear frame as reciprocatory motion. The shear gate is pivotally connected with a follower strap on its operating eccentric which is driven at the same speed as the operating eccentric of the shear frame and coordinated therewith for cut-cycle performance of the blades during each revolution of these operating eccentrics. Thus, each cut-cycle involves a single reciprocation of the shear frame and gate and a single reciprocation of the gate with its blade into and from shearing relation with the other blade on the frame, and cut action of the blades when the shear frame and gate are substantially midway of their reciprocation in stock-following direction at which they move in temporary synchronism with the stock for a certain length of cut at a given feed rate of the stock which in this type of shear may be constant. Accordingly, for cutting uniformly fed stock into lengths of infinite variability, the operating eccentrics must be driven at infinitely variable speed to vary the duration of the cut-cycles which alone determines the length of cut of the stock, i.e., the cut-length. However, while the cut-length is thus solely determined by the duration of each cut-cycle, it happens rarely in average use of the shear that the desired cut-length is of that single length at which the blades travel in synchronism with the stock at the times of cut, wherefore for all other cut-lengths modification of the reciprocation of the shear frame and gate is required to achieve synchronization of the blades with the stock at the times of cut. To this end, the synchronizing eccentric is oscillated at variable amplitude once back-and-forth during each cut-cycle to impart to the arm additional superimposed oscillation about its operating eccentric and of such amplitude that at the resulting increased or decreased reciprocation range of the shear frame and gate the blades will be in synchronism with the stock at the times of cut. For oscillation of the synchronizing eccentric at variable amplitude there is usually provided a crank disc which turns in unison with the operating eccentric of the shear frame, and a rack which at one end is pivotally connected with a crank pin that is diametrically adjustable in the crank disc, and at its other end is in constant mesh with a gear that turns with the synchronizing eccentric. Thus, on adjusting the crank pin to opposite sides of the axis of the crank disc, the superimposed motions imparted to the shear frame gate by the synchronizing eccentric will increase and decrease, respectively, their primary reciprocation range derived from the frame's operating eccentric, with the crank pin being adjusted in axial alignment with the crank disc on selecting the cut-length at that single length at which synchronism will be achieved at this primary reciprocation range of the shear frame and gate.

Another type of flying shear, called "guillotine" shear, is similar to the described rod shear, except that the shear frame has compound bodily and oscillatory motions of which the bodily motion is in the shearing direction of the blades, and the oscillatory motion, which is participated in by the gate, takes place about its pivot connection with the follower strap on the synchronizing eccentric. Accordingly, both blades move into and from shearing relation with each other. Also, in this type of shear the operating eccentrics of the shear frame and gate turn coaxially, and these operating eccentrics are more usually driven at constant speed for variable cut-lengths over a given range, whereby the rate of feed of the stock is infinitely variable to determine the cut-length within the range, and the amplitude of oscillation of the synchronizing eccentric is adjusted to achieve synchronization of the blades with the stock at the times of cut for the selected cut-length. Infinitely variable adjustment of the feed rate of the stock at uniform operating speed of this type of shear for different cut-lengths is thus the converse of infinite variability of the operating speed of the earlier described shear at uniform feed rate of the stock to the same end, i.e., for achieving different cut-lengths, with the synchronizing eccentric of variable amplitude of oscillation serving in either shear to achieve synchronization of the blades with the stock at the times of cut for any selected cut-lengths.

While these different types of shears perform entirely satisfactory, they are also of fairly complex construction and corresponding cost, and this is due in large part to the provision of the crank disc with its adjustable crank pin and associated rack-and-gear drive of the synchronizing eccentric for its oscillation at variable amplitude. Also, the back-and-forth moving masses of the rack and gear and the synchronizing eccentric in operation adversely affect the smoothness of operation of these shears especially at the presently required high operating speeds.

It is an object of the present invention to provide a flying shear of either of the aforementioned types which has substantially all the advantages of the prior shears in point of a great multitude of different cut-lengths and ready and accurate synchronization of the blades with the stock at the times of cut at any selected cut-length, yet is of simpler construction and lower cost, and performs smoother at any operating speed, than the prior shears.

It is another object of the present invention to provide a flying shear of the aforementioned simpler construction and lower cost as well as smoother performance, in which the synchronizing eccentric is operationally driven continuously with the operating eccentrics of the shear frame and gate, thereby dispensing with the previous crank, rack and gear drive of this eccentric and also its operational oscillation.

It is a further object of the present invention to provide a flying shear in which the aforementioned continuous drive of the synchronizing eccentric with the operating eccentrics of the shear frame and gate is made possible for any one of the multitude of different cut-lengths within a range, by providing for adjustability of the synchronizing eccentric and of the operating eccentric of the shear frame relative to each other and to the operating eccentric of the shear gate in such manner that at the time of cut of any selected cut-length, i.e., when the operating eccentric of the shear gate is in the usual cutting position, the adjusted eccentrics will combine to move the shear frame and gate in stock-following direction at the same speed at which they would be moved if in lieu of these adjusted eccentrics the previous crank, rack and gear drive for oscillation of the synchronizing eccentric were used and set for the same cut-length.

Another object of the present invention is to provide a flying shear in which adjustability of the synchronizing eccentric and of the operating eccentric of the shear frame for the aforementioned purpose is achieved, by first of all driving them in the same direction, then providing for their adjustment for the maximum cut-length at which they assume a relative position in which at the time of cut they extend with their largest radii parallel but in opposition to each other and on their normal drive then impart to the shear frame and gate stock-following motion at the maximum rate, and providing for their further adjustment in very small increments from this relative position, for any shorter cut-lengths always by equal, or nearly equal, amounts and in opposite directions, each through a maximum of 90 degrees at which they are at their other relative position in which they impart no stock-following motion to the shear frame and gate at the times of cut. The range of variable cut lengths afforded by mere adjustability of these eccentrics is thus particularly large, extending from zero to the maximum cut-length. Further, in coordinating these eccentrics in point of their drive direction and adjustment for any cut-length, as described, and by further making the operating eccentric of the shear frame and the synchronizing eccentric of the same eccentricity, the oscillating arm, which is usually made to extend normal to the passing stock at the times of cut of maximum cut-lengths, will for any other cut-length also extend normal to the passing stock at the times of cut, which in the case of a guillotine shear has the advantage that the shear blades move normal to the stock at the times of cut of any lengths for best shear results and least wear of the shear blades, even though the shear frame will, for different cut-lengths, operationally assume at the times of cut different positions longitudinally of the stock. In case of a rod shear, the reciprocating shear frame will, for different cut-lengths, also operationally assume at the times of cut different positions longitudinally of the stock, but this will not interfere with the advantageous motion of the shear blade on the guided gate normal to the stock at all times, including cutting times, since the follower strap on the operating eccentric of the shear gate has a pivot connection with the latter.

A further object of the present invention is to provide a flying shear in which the synchronizing eccentric and the operating eccentrics of the shear frame and gate are interconnected by gears arranged to drive these eccentrics at a one-to-one ratio and the synchronizing eccentric and operating eccentric of the shear frame in the same direction, with the gears turning with the synchronizing eccentric and operating eccentric of the shear frame being disengageable from the respective eccentrics for adjustment of the latter for different cut-lengths without disturbing the operating eccentric of the shear gate in its cut-timing position, and with another gear receiving the input of the shear drive of all gears.

It is another object of the present invention to provide a flying shear in which accurate adjustment of the synchronizing eccentric and of the operating eccentric of the shear frame for different cut-lengths is particularly facilitated, on the one hand by arranging at least the gears normally turning with these eccentrics within ready view of an attendant and extending through these gears suitable and readily accessible shank extensions of the shanks which carry the respective eccentrics, and on the other hand by providing these shaft extensions with pointers which cooperate with graduated scales on the associated gears that not only denote different cut-lengths but also afford an indication for eccentric adjustment in the right direction for a desired cut-length. Thus, an attendant will, on disengagement of the gears from the respective shafts, have ready access to their shank extensions and there undertake correct turning adjustment of the shafts and their eccentrics by simply bringing the pointers to the scale graduations denoting the desired cut-length, and then reengaging the gears with the shafts.

Further objects and advantages will appear to those skilled in the art from the following, considered in conjunction with the accompanying drawings.

In the accompanying drawings, in which certain modes of carrying out the present invention are shown for illustrative purposes.

Figures 1, 2, 7:
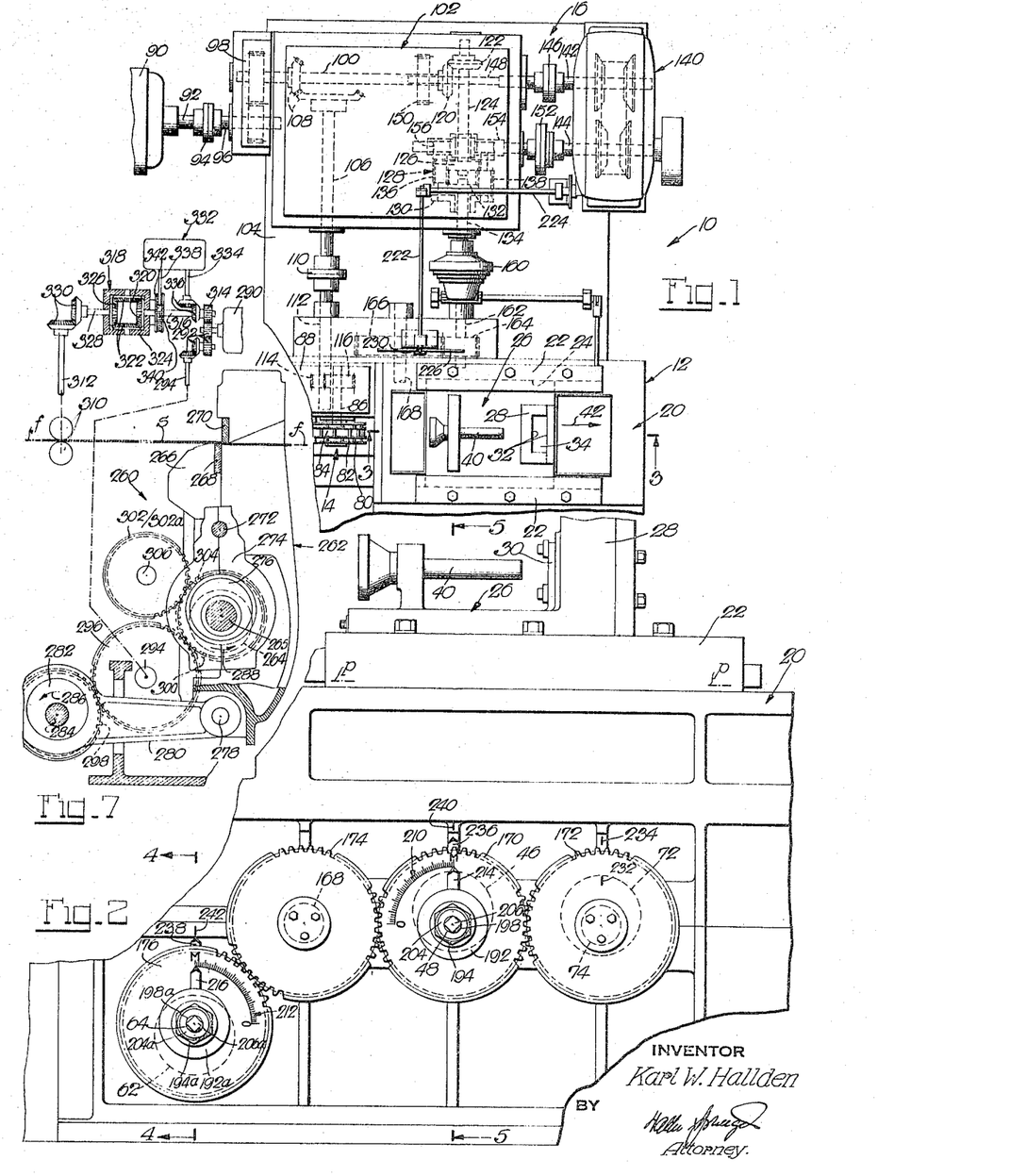
FIG. 1 is a fragmentary plan view of a flying shear embodying the present invention.
FIG. 2 is an enlarged, fragmentary side view of the shear.
FIG. 7 is a diagrammatic view, partly in section, of a shear embodying the present invention in a modified manner.

Referring to the drawings, and more particularly to FIG. 1 thereof, the reference numeral 10 designates a shear installation which has as its major components a flying shear 12, a stock feed 14 and a drive 16 for the shear and feed. The shear 12 is in this example adapted to cut rod stock on its continuous pass through a drawing die, and to this end the feed 14 pulls the stock through the drawing die (not shown) and delivers it to the shear 12 at a uniform feed rate.

*Flying shear*

Figure 3:
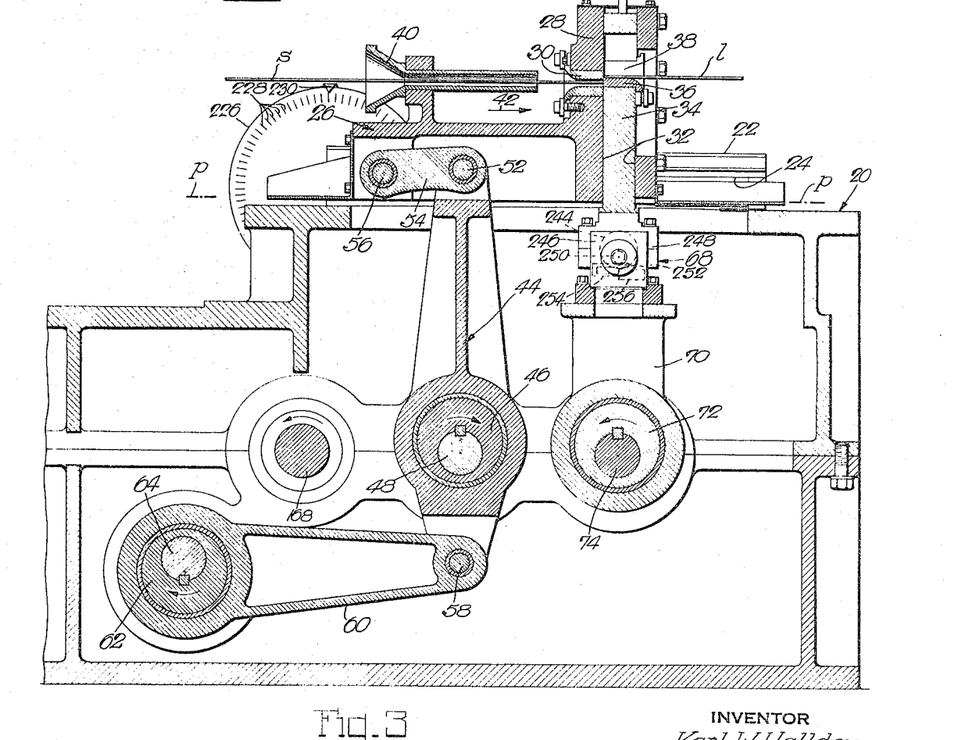
FIG. 3 is an enlarged section through part of the shear as taken on the line 3—3 of FIG. 1.

Referring to FIGS. 1 to 5, there is shown a main frame 20 which at its top has bolted thereto opposite gibs 22 which together with the frame top form a horizontal guideway 24 for a shear frame or slide 26. Carried by the shear head 28 of the slide 26 is a shear blade in the form of a fixed sleeve-type shear die 30 in alignment with the fed rod stock s (FIG. 3). The shear head 28 also provides a vertical guideway 32 in which is reciprocable a shear gate 34 carrying a shear die 36 which is the companion to the shear die 30 in the shear head 28. The shear die 36, is like the fixed shear die 30, of sleeve type, but is cut-away at 38 to facilitate the removal of cut rod lengths l. Mounted in an upright wall on the slide 26 is a guide 40 which serves to direct the leading end of a new supply of rod stock s into the fixed shear die 30.

The slide 26 is adapted to be continuously reciprocated in its guideway 24 so that the shear dies 30, 36 move, at least during a portion of the slide's stock-following stroke in the direction of the arrow 42 in FIG. 3, at the same rate as the uniformly fed rod stock s. More particularly, and as more fully described hereinafter, the slide 26 is moved in substantial synchronism with the stock s at the times the shear dies 30, 36 perform a rod-cutting operation. Also, and as more fully described hereinafter, the shear has provisions for cutting rods of many different lengths within certain limits.

Figure 4:
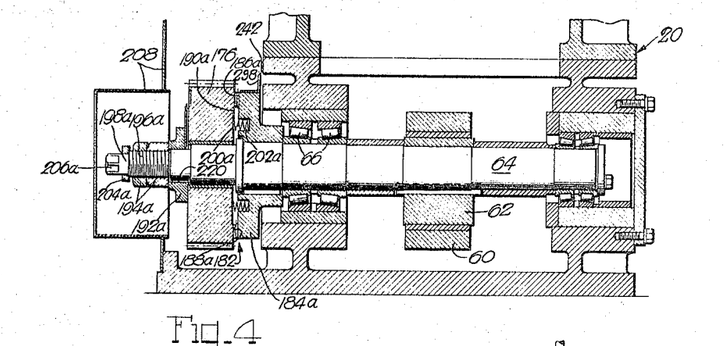
FIGS. 4 and 5 are fragmentary sections through the shear taken substantially along the lines 4—4 and 5—5, respectively, of FIG. 2.
Figures 5, 6:
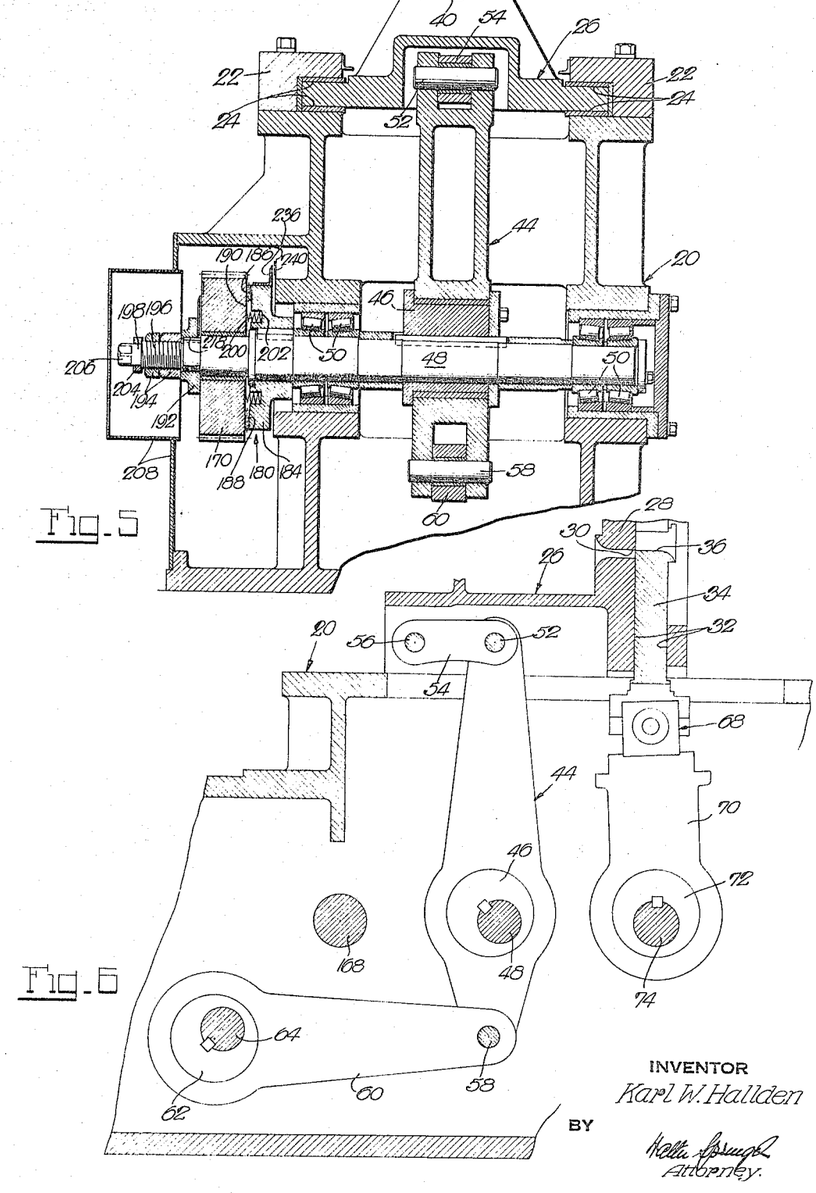
FIG. 6 is a fragmentary diagrammatic view, partly in section, of the shear in a different operating condition.

The slide 26 is reciprocated in its guideway 24 by an arm 44 which intermediate its ends is turnably supported on an operating eccentric 46 on a transverse shaft 48 that is journalled in bearings 50 in the main frame 20 (FIG. 5). To this end, the upper end of the arm 44 is at 52 pivotally connected with one end of a link 54 which with its other end is pivotally connected at 56 with the slide 26 (FIG. 3). The link 54 thus forms between the arm 44 and slide 26 a pivot connection which is floatable substantially normal to the guideway 24. The lower end of the arm 44 is pivotally connected at 58 with a follower strap 60 on another eccentric 62, hereinafter referred to as "synchronizing" eccentric, which is carried by a transverse shaft 64 that is journalled in bearings 66 in the main frame 20 (FIG. 4). Thus, on the simultaneous drive of the eccentrics 46 and 62, the eccentric 46 oscillates the arm 44 about its pivot connection 58 with the follower strap 60 while the other eccentric 62 oscillates the arm 44 about the eccentric 46 (FIG. 3).

For operation of the shear gate 34 with its die 36 into and from shearing relation with the fixed die 30 in the shear head 28, the shear gate 34 is by a pivot device 68 connected with a follower strap 70 on another operating eccentric 72 on a transverse shaft 74 which is journalled in suitable bearings in the main frame 20 (FIG. 3).

Stock feed

The stock feed is in this instance a chain-type feed (FIG. 1) having opposed endless chains 80 each passing over spaced sprockets 82 and having stock-gripping pads 84. One sprocket of each chain 80 is power-driven in a manner described hereinafter, with the sprockets being carried by shafts 86 that are journalled in suitable bearings in a feed frame 88 on the main frame 20. The present chain-type feed 14 may in all respects be like the stock feed disclosed in my prior Patent No. 2,734,570, dated Feb. 14, 1956, wherefore no further description of the present stock feed 14 is necessary.

Drive for the shear and feed

Referring now to FIG. 1, there is shown a prime mover, in this instance an electric motor 90 the shaft 92 of which is coupled at 94 to the input shaft 96 of reduction gearing 98 the output shaft 100 of which extends into a gear box 102 that may suitably be mounted on a base 104 in back of the main frame 20. Suitably journalled in the gear box 102 is a shaft 106 which extends at right angles to the shaft 100 and is driving connected with the latter through bevel gearing 108. Shaft 106 is coupled at 110 to a shaft 112 which is suitably journalled in the main frame 20 and carries a gear 114 which through a gear drive 116 into the feed frame 88 is operatively connected with a sprocket 82 of one of the chains 80 of the feed 14, with the adjacent sprocket of the other chain 80 being suitbaly connected with the driven sprocket at a one-to-one ratio. Thus, on operation of the motor 90, the stock feed 14 will be operated, with the rod stock s being fed at a uniform rate when the motor 90 runs at uniform speed.

With the exemplary rate of feed of the rod stock in the present shear being uniform as stated, it stands to reason that in order to achieve variable cut-lengths of the rod stock, the shear must be driven at variable speed. Thus, if great cut-lengths are required, the duration of each cut-cycle of the shear during one complete revolution of the operating eccentrics 46 and 72 must be extended in order that a greater length of the uniformly fed stock will pass the shear dies 30, 36 between successive cut actions of the latter. Conversely, if shorter cut-lengths are required, the duration of each cut-cycle of the shear must be shortened in order that a shorter length of the uniformly fed stock will pass the shear dies 30, 36 bewteen successive cut actions of the latter. The drive of the operating eccentrics 46 and 72, to the end of obtaining variations in the duration of the cut-cycles of the shear and, hence, variable cut-lengths, is as follows. Carried by the shaft 100 in the gear box 102 (FIG. 1) is a bevel gear 120 which is in mesh with a bevel gear 122 on a suitably journalled shaft 124 which also carries a sun gear 126 of a planetary differential 128 having a frame 130. The differential 128 provides another sun gear 132 on one end of a suitably journalled output shaft 134. The frame 130 of the differential 128 is freely rotatable on the aligned shafts 124 and 134. Rotatably carried by the frame 130 of the differential 128 are sets of planetary gears 136 and 138 of which the gears of each set are in mesh with each other and also with the sun gears 126 and 132, respectively, as in typical planetary gearing. The differential 128 serves to transmit by far the greater portion of the motor power to the operating eccentrics 46 and 72 as will appear more obvious hereinafter.

Provisions are also made for driving the frame 130 of the differential 128 at variable speeds within certain limits, thereby to obtain variable speeds within certain limits of the output shaft 134 of the differential. To this end, there is provided an infinitely adjustable speed-ratio unit 140 having an input shaft 142 and an output shaft 144. The speed-ratio unit 140 is a commercial device known as a "P.I.V.," which comprises a sprocket chain arranged in driving relation with each of two pairs of conical sprocket wheels of which the wheels of each pair are adjustable toward and away from each other for changing the speed of the output shaft 144. Structural details of the speed-ratio unit 140 are not disclosed herein, but are fully illustrated in my prior Patent No. 2,201,581, dated May 21, 1940.

The input shaft 142 of the speed-ratio unit 140 is coupled at 146 to a suitably journalled shaft 148 which extends parallel to, but spaced from, the shaft 100 and is drivingly connected with the latter through a pair of gears 150. The output shaft 144 of the speed-ratio unit 140 is at 152 coupled to a suitably journalled worm 154 which is in mesh with a worm gear 156 that is fast on the frame 130 of the differential 128. The speed-ratio unit 140 will transmit only a minor portion of the motor power to the operating eccentrics 46 and 72.

The speed-ratio 140 is presettable so as infinitely to vary the speed of the output shaft 144 thereof and, hence, also the rotary speed of the frame 130 of the differential 128. Accordingly, the output shaft 134 of the differential 128 may be driven at infinitely variable speeds within certain limits, depending on the adjustment of the speed-ratio unit 140.

The output shaft 134 of the differential 128 is through a clutch 160 releasably connected with a shaft 162 carrying a gear 164 that is in mesh with a gear 166 on a shaft 168 which is suitably journalled in the main frame 20 and constitutes the drive input shaft for the shear. This input shaft 168, as well as the shafts 48, 74, 64 which carry the operating eccentrics 46, 72 and the synchronizing eccentric 62, extend to the exposed side of the main frame 20 (FIGS. 2, 4 and 5), and all of these shafts extend parallel to each other, with the input shaft 168 further extending between the shafts 48 and 64. For the drive of the operating eccentrics 46 and 72 at variable speeds, their respective shafts 48 and 74 carry on the exposed side of the main frame gears 170 and 172 which are in mesh with each other and of which gear 170 is also in mesh with a gear 174 on the input shaft 168, with at least the gears 170 and 172 being of the same size for their drive at a one-to-one ratio.

While the explained variations of the operating speed of the shear, i.e., variations of its cut-cycle duration, determine different cut-lengths within a given range, it will be necessary for all cut-lengths to modify the operational oscillation of the arm 44 in order that the shear dies 30, 36 will move in synchronism with the uniformly fed stock at the times of cut. This modification of the oscillation of the arm 44 is achieved by the synchronizing eccentric 62 which on its drive imparts to the arm 44 superimposed oscillations about its operating eccentric 46 which may be additive to or subtractive from the primary oscillations imparted to this arm by its operating eccentric 46 about its pivot connection 58 with the follower strap on the synchronizing eccentric 62, whichever is required for synchronization of the shear dies 30, 36 with the stock at the times of cut of a selected cut-length. For the drive of the synchronizing eccentric 62, its shaft 64 carries at the exposed side of the main frame 20 a gear 176 (FIG. 2) which is in mesh with the gear 174 on the input shaft 168 and, hence, is driven in the same direction as the shaft 48 of the operating eccentric 46 of the arm 44. Moreover, the gear 176 is of the same size as the gears 170 and 172 and, hence, is driven at a one-to-one ratio with the latter gears. Accordingly, the synchronizing eccentric 62 is driven in the same direction as the operating eccentric 46 of the arm 44, and all eccentrics 62, 46 and 72 are driven at a one-to-one ratio.

For synchronization of the shear with the uniformly fed stock for different cut-lengths, recourse is had to angular adjustment of the synchronizing eccentric 62 and of the operating eccentric 46 of the arm 44 relative to each other and to the cut-timing operating eccentric 72 of the shear gate 34 when the shear is at rest, which requires disengagement of the shafts 64 and 48 from the power drive of the shear. To this end, the gears 170 and 176 are loose on the respective shafts 48 and 64, and they are through clutches 180 and 182 connectible with and disconnectible from these shafts 48 and 64 (FIGS. 5 and 4). Thus, the shaft 48 (FIG. 5) has keyed thereto one member 184 of the clutch 180 having radial teeth 186 on its face, with the companion member of this clutch being formed in this instance by radial teeth 188 directly on the rear face 190 of the gear 170 which on axial shift of the latter on the shaft 48 engage with and disengage from the teeth 186 of the clutch member 184. The gear 170 is held in clutch-engaged position by a collar 192 and nuts 194 on the threaded part 196 of a forward shank extension 198 of the shaft 48. The gear 170 is normally urged into clutch-disengaged position by springs 200 seated in apertures 202 in the face of the clutch member 184, with clutch-disengaging movement of the gear 170 being limited by a fixed collar 204 on the shaft extension 198 which limits turning of the nuts 194 in loosening direction. The end 206 of the shaft extension 198 is formed as a head which in this instance is square for application of a wrench with which an attendant may conveniently turn the shaft 48 into any angularly adjusted position when the gear 170 is in clutch-disengaged position. The gear 176 is through the clutch 182 connectible with and disconnectible from the shaft 64 of the synchronizing eccentric 62 in the same manner and by identical structural parts (FIG. 4) which are designated by the same reference numerals as their counterparts in FIG. 5, except that the suffix "a" has been added.

The gears 170 to 176 (FIG. 2) are normally hidden from view behind a gate 208 (FIGS. 4 and 5) which is mounted on the main frame 20 in any suitable manner so that it may be opened for ready access to these gears.

*Mode of operation*

With the shear in operation and its parts passing on the arrow-indicated drive of the eccentrics 46, 62 and 72 through the position in FIG. 3 in which the dies 30, 36 perform a cut action on the stock $s$, it appears that the shear is set for cutting the stock into maximum cut-lengths. Thus, with the eccentrics 46 and 62 being, at the time of cut as determined by the up-position of the shear gate eccentric 72, in the relative position in FIG. 3 in which they extend with their largest radii in opposite directions and normal to the plane $p$ in which the slide 26 reciprocates, it follows that the oscillations imparted by the respective eccentrics 46 and 62 to the arm 44 are of maximum amplitudes and also additive, wherefore the amplitude of oscillation of the arm 44 and, hence, the range of reciprocation of the slide 26 are at a maximum.

This means that for cutting stock at a given uniform feed rate, the cut-cycles are then of maximum duration which denotes maximum cut-lengths as explained, for in order to achieve synchronization of the shear dies with the stock at the times of cut, at which the oscillatory and reciprocatory speeds of the arm 44 and slide 26 are at a maximum (FIG. 3), it is necessary that the operating speed of the shear, i.e., of the input shaft 168, is then at a minimum, hence the maximum duration of the cut-cycles. The operating speed of the shear is adjusted to this end by adjusting the speed-ratio unit 140 (FIG. 1), as will be readily understood.

Assuming now that stock $s$ is to be cut at a shorter than maximum cut-length, the arm eccentric 46 and synchronizing eccentric 62 will then be adjusted relative to each other and to the shear gate eccentric 72 while the shear is at rest. To this end, the gears 170 and 176 are disconnected from their respective shafts 48 and 64 and the latter adjusted at their square heads 206 and 206a (FIGS. 2, 4 and 5), whereupon these gears are reconnected with their shafts. Adjustment of these eccentrics will, for a reason explained hereinafter, be always in opposite directions and in equal, or nearly equal, increments. Thus, assuming that the adjustment of the eccentrics 46 and 62 is such that at the times of cut, i.e., in the up position of the shear gate eccentric 72, they pass through the respective positions shown in FIG. 6, the cut-length will be less than maximum. This is so because at the indicated positions of the eccentrics 46 and 62 at the times of cut (FIG. 6) it appears that the oscillatory and reciprocatory speeds of the arm 44 and slide 26 are considerably lower than for the maximum cut-length (FIG. 3), which means that for synchronization of the shear dies with the uniformly fed stock at the times of cut the operating speed of the shear has to be increased by adjustment of the speed-ratio unit 140, with ensuing shortening of the duration of each cut-cycle and, hence, a shorter cut-length, as explained. The shear and its drive are thus adjustable for cut-lengths which may vary from the explained maximum cut-length downwardly to zero cut-length to-be-explained.

To facilitate accurate relative adjustment of the eccentrics 46 and 62 for any desired cut-length within the range from zero to maximum, there are advantageously provided scales 210 and 212 on the gears 170 and 176 and therewith coordinated pointers 214 and 216 on the shafts 48 and 64 which carry these gears (FIG. 2). The pointers 214 and 216 are in this instance provided on the collars 192 and 192a which for turning movement of these pointers with their respective shafts 48 and 64 are keyed to the latter at 218 and 220 (FIGS. 5 and 4). Also, the pointers 214 and 216 are in this instance in alignment with the largest radii of the eccentrics 46 and 62 on their respective shafts 48 and 64 (FIG. 2), with the pointer 214 in this instance extending radially also in the same direction as the largest radius of the eccentric 46. The adjustment of the eccentrics 46 and 62 according to the pointers 214 and 216 and their coordinated scales 210 and 212 as shown is for maximum cut-lengths (FIG. 3) for which the pointers 214 and 216 are in alignment with end graduations of their respective scales 210 and 212 which may appropriately be marked to denote maximum cut-lengths, such as by the indicated mark M (FIG. 2). Accurate adjustment of the eccentrics 46 and 62 for any cut-length within the range may be undertaken by reference to the pointers 214, 216 and their respective scales 210 and 212 in any relative position of the eccentrics 46, 62 and 72 when the shear is idle, such as a cycle-start position in which these eccentrics are 180 degrees apart from their positions shown in FIGS. 2 and 3. Adjustment of the eccentrics 46 and 62 for different cut-lengths may, for reasons explained hereinafter, be advantageously undertaken in the cut-positions of the eccentrics shown in FIGS. 2 and 3, this being possible since there are usually provisions in the shear drive to jog the eccentrics into any position. The graduations of both scales 210 and 212 are preferably spaced apart in equal angular degrees.

Assuming now that the shear has been jogged into the condition in FIGS. 2 and 3, and it is desired to adjust the shear from the set maximum cut-length to a shorter cut-length, an attendant will simply disengage the gears 170 and 176 from their respective shafts 48 and 64 in explained manner, then turn shaft 48 counterclockwise until the pointer 214 aligns with that graduation of the scale 210 which corresponds to the selected shorter cut-length and reengage gear 170 with the thus adjusted shaft, and finally turn shaft 64 clockwise until the pointer 216 aligns with that graduation of the scale 212 which corresponds to the same selected shorter cut-length and reengage gear 176 with the thus adjusted shaft. The shear is now set for the selected shorter cut-length, and there remains now only the task of preadjusting the drive of the shear to the selected cut-length by adjustment of the speed-ratio unit 140. For adjustment of the speed-ratio unit 140 (FIG. 1), a rotary shaft 222 of a suitable adjustment drive 224 of this unit carries a readily accessible disc 226 (see also FIG. 3) which may be turned to adjust the speed-ratio unit 140. Rapid and correct adjustment of the speed-ratio unit 140 to a selected cut-length is greatly facilitated by providing the disc 226 with graduations 228 (FIG. 3) that denote different cut-lengths and may be marked (not shown) to indicate stock cuts of proportionately shorter lengths than a maximum cut-length, and by further providing a fixed pointer 230 to which is turned the graduation on the disc 226 which corresponds to the selected cut-length. The graduations of the scales 210 and 212 (FIG. 2) may similarly be marked (not shown) to indicate stock cuts of proportionately shorter lengths than the exemplary indicated maximum cut-length M. Rapid and correct adjustment of the shear and its drive to any one of the already numerous cut-lengths represented by the graduations of the scales 210 and 212 and by the graduations on the speed-ratio unit adjusting disc 226 is thus greatly facilitated by the provision of these graduations. However, and as is obvious, the shear and its drive may with equal rapidity and fair accuracy be adjusted to cut-lengths intermediate any of the cut-lengths represented by successive graduations, and could even be adjusted to infinitely variable cut-lengths were it not in this instance for the exemplary clutches 180 and 182 between the gears 170 and 176 and their respective shafts 48 and 64 which, owing to their interengaging teeth, do not permit reengagement at infinite relative positions of their members. Also, cut-lengths midway between those represented by successive graduations of the scales 210 and 214 may be achieved by aligning one of the pointers 214 or 216 with that graduation on its associated scale 210 or 212 which represents the next smaller cut-length on that scale, and aligning the other pointer with that graduation on its scale which represents the next larger cut-length on that scale.

Assuming now that in idle condition of the shear and at the relative position of the eccentrics 46, 62 and 72 in FIG. 2, the eccentrics 46 and 62 are adjusted into positions 90 degrees apart from those shown, i.e., when the pointers 214 and 216 are in alignment with the other end graduations of their associated scales 210 and 212, it is obvious that these eccentrics will then extend at the times of cut with their largest radii parallel to the plane p, which means that at the times of cut the arm 44 has no oscillatory motion and the slide 26 has no reciprocatory motion, in which case the shear is no longer a flying shear, but acts as a stationary shear which can be used as such, if desired, but obviously without the stock feed 14. Of course, the arm 44 and slide 26 will during each such cut-cycle of zero cut-length be operationally moved by the driven eccentrics 46 and 62, but will be without motion at the times of cut as explained. Appropriately, the other end graduations of the scales 210 and 212 with which the respective pointers 214 and 216 align for zero cut-length may be marked 0 as shown to indicate zero cut-length. However, the arm 44 and slide 26 will at any other relative adjustment of the eccentrics 46 and 62 have operational movement at the times of cut for cutting the moving stock into lengths, with the cut-lengths being variable between maximum and zero on variations in the adjustment of the eccentrics 46 and 62 from their relative position in FIG. 2 to their explained relative position for zero cut-length at the times of cut.

Adjustment of the eccentrics 46 and 62 on the idle shear while the shear gate eccentric 72 is in its up or cut position (FIG. 2) is advantageous in that, by providing the gear 172 with a marker or pointer 232 which indicates the high point of the cut-timing eccentric 72 and by further providing on the main frame 20 adjacent the gear 172 a fixed marker 234 which indicates the angular position of the high point of this eccentric 72 at the times of cut, these markers 232 and 234 will then be in alignment as as shown (FIG. 2) and assure the attendant that the other eccentrics 46 and 62 will be in the positions as adjusted at the times of cut. Also, to facilitate initial assembly with the shafts 48 and 64 of the gears 170 and 176 or replacements thereof with their respective scales 210 and 212 in correct relation to the cut-timing eccentric 72, the clutch members 184 and 184a on the shafts 48 and 64 carry additional pointers 236 and 238, respectively, which indicate the high and low points of the respective eccentrics 46 and 62 and align with fixed markers 240 and 242, respectively, on the main frame when the eccentrics 46 and 62 are in the reference positions for maximum cut-length at the times of cut. Hence, on turning the shafts 48, 64 and 74 into the positions in FIG. 2 in which the marker 232 on the gear 172 aligns with the fixed marker 234 and the pointers 236 and 238 on the shafts 48 and 64 align with the fixed markers 240 and 242, as shown, the gears 170 and 176 will be correctly assembled with their shafts 48 and 64 on aligning the M graduations of their scales with the respective pointers 236 and 238.

As already mentioned, adjustment of the eccentrics 46 and 62 is always in opposite directions and in equal, or nearly equal, increments. In so doing, and with the eccentricities of the eccentrics 46 and 62 being preferably the same, the arm 44 will at the time of cut of any cut-length be in the same angular position on its operating eccentric 46, i.e., normal to the plane p. This keeps the range within which the shear dies 30, 36 deviate in their position longitudinally of the plane p at the times of cut over the entire range of cut-lengths, at an advantageous minimum so that the shear gate eccentric 72 will in its up position (FIG. 3) always bring the shear die 36 into cutting relation with the fixed shear die 30 even though for all cut-lengths except maximum cut-length the follower strap 70 on the eccentric 72 will be differently inclined at the times of cut (FIG. 6). Also, since at the described adjustments of the eccentrics 46 and 62 at equal eccentricities of the latter, the arm 44 will for any cut-length extend normal to the plane p, it stands to reason that in the described adjustment of these eccentrics for zero cut-length the arm 44 will have no oscillatory motion either about its operating eccentric 46 or about its pivot connection 58 with the eccentric strap 60, but will have operational movement up and down normal to the plane p and back-and-forth movement parallel to the plane p, as will be readily understood.

Provisions are also made for mis-cut action of the shear. To this end the pivot device 68 between the follower strap 70 on the operating eccentric 72 and the shear gate 34 (FIG. 3) provides a turnable eccentric 244 in a head part 246 of the follower strap 70, with this eccentric serving as a pivot connection between the strap 70 and a follower end 248 of the shear gate 34. Turnable with the eccentric 244 is a gear 250 which is in mesh with a rack 252 on the rod 254 of a plunger in a cylinder 256 which is operated under suitable control to turn the eccentric 244 into the up or cut position shown (FIG. 3) or into a down or mis-cut position 180 degrees displaced from the position shown.

While in the foregoing description reference is had to maximum cut-length, this need not be a fixed predetermined length but is usually a variable length on running the variable-speed motor 90 at different speeds.

Reference is now had to FIG. 7 which shows a guillotine-type shear 260 embodying the present invention. This shear comprises a shear frame 262 on an operating eccentric 264 carried by a shaft 265, and a shear gate 266 which is guided on the frame 262 for movement with its blade 268 into and from shearing relation with the companion blade 270 on the frame 262, and is pivotally connected at 272 with a follower strap 274 on an operating eccentric 276 which is turnable on the shaft 265. Pivotally connected at 278 with the shear frame 262 is a follower strap 280 on a synchronizing eccentric 282 on a shaft 284.

In operation of the shear on continuously moving stock s, such as sheet stock, for example, the eccentrics 264, 276 and 282 are driven at a one-to-one ratio and the synchronizing and frame-operating eccentrics 282 and 264 are driven in the same direction as indicated by the arrows 286 and 288, respectively. The operating parts of the shear are shown at the time of cut as evidenced by the up and down positions of the shear gate and shear frame frame eccentrics 276 and 264, respectively, and by the shear blades 268, 270 themselves. Further, the operating parts of the shear are shown for maximum cut-length as evidenced by the illustrated positions of the synchronizing and shear frame eccentrics 282 and 264 in which they extend with their largest radii normal to the linear feed path f of the stock s and in opposite directions.

For the drive of the shear, there is provided a prime mover 290, in this instance a variable-speed motor which through suitable gearing 292 drives the input shaft 294 of the shear, and meshing gears 296, 298, 300, 302, 302a, and 304. Of these gears, gear 296 is carried by the input shaft 294, gears 298 and 300 are on the shafts 284 and 265, respectively, and mesh with the gear 296, gear 304 is of the same size as gear 300 and is turnable with the shear gate eccentric 276 on and relative to the shaft 265, and the gears 302 and 302a, which are of identical size, are carried by a countershaft 306 and mesh with the gears 300 and 304, respectively. Also, gear 298 is of the same size as the gears 300 and 304, wherefore on the drive of the input shaft 294 the synchronizing eccentric 282 and the shear frame and shear gate eccentrics 264 and 276 are driven at one-to-one ratio, and the synchronizing eccentric 282 and shear frame eccentric 264 are also driven in the same, counterclockwise, direction.

To vary the cut-length of the shear, the synchronizing and shear frame eccentrics 282 and 264 are adjusted relative to each other and to the shear gate eccentric 276. To this end, the gears 298 and 300 are connectible with and disconnectible from their respective shafts 284 and 265 by clutches (not shown) in similar manner as in the described shear 12, so that these disconnected shafts 284 and 265 and the eccentrics 282 and 264 thereon may be adjusted in a manner which is now obvious in view of the described adjustment of the corresponding shafts in the described shear 12. To achieve rapid and correct adjustment of these shafts 284 and 265, recourse may be had to scale and pointer provisions (not shown) similarly as in the described shear 12.

With the operating speed of the present shear 260 being uniform at uniform running speed of the variable-speed motor 290, and with the amplitude of oscillation of the shear frame and gate varying with different cut-lengths, it stands to reason that the feed rate of the stock s will have to be variable in accordance with the large multitude of different cut-lengths between maximum and zero of which the shear is capable, in order that the shear blades 268, 270 will move in synchronism with the stock s at the times of cut of any selected cut-length. To this end, the stock feed, represented by the feed rolls 310, is driven from an input shaft 312 which, in turn, may be driven at infinitely variable speed between limits from the motor 290. Thus, the primary power drive of the feed input shaft 312 from the motor 290 is via gear 314, shaft 316, a planetary differential 318 with a sun gear 320 on the shaft 316, planetary gears 322 which turn with a housing 324, and another sun gear 326 on the output shaft 328 of the differential, and bevel gears 330 which connect shaft 328 with the feed input shaft 312. For infinite variation of the speed of the feed input shaft 312, there is provided a speed-ratio unit 332 of the same type as the speed-ratio unit 140 of the described shear 12, with the input shaft 334 of this unit 332 being driven from the shaft 316 by bevel gears 336, and the output shaft 338 thereof carrying a worm 340 in mesh with a worm gear 342 on the differential housing 324. Thus, by adjusting the speed-ratio unit 332, the differential housing 324 may be driven at infinitely variable speed to thereby vary the speed of the feed input shaft 312 and stock feed 310 and hence, the feed rate of the stock s as required for the different cut-lengths.

The present shear 260 thus operates quite similarly as the described shear 12, except that the companion shear blades 268, 270 participate in the oscillatory motion of the shear frame 262 and the shear blade 270 on the shear frame is also movable toward and away from the shear blade 268 on the shear gate 266.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a flying shear, the combination with companion shear blades, means including an arm for moving said blades back-and-forth along fed stock on oscillation of said arm and for guiding one blade into and from shearing relation with the other blade, and three turntable eccentrics of which a first eccentric turnably supports said arm, a second eccentric has a follower strap pivotally connected with said one blade, and a third eccentric has a follower strap pivotally connected with said arm remote from said first eccentric, of a first power drive including driven members turnable with said eccentrics, respectively, for driving the latter at a one-to-one ratio and said first and third eccentrics in the same direction; clutch means between said first and third eccentrics and respective driven members for their disengagement from and reengagement with each other to permit angular adjustment of the disengaged eccentrics relative to each other and to said second eccentric into different relative positions in which, on their reengagement with the respective driven members and power drive, the combined oscillation imparted by them to said arm will be of correspondingly different amplitudes; means for feeding stock to said blades; another power drive for said feeding means; and means for varying the speed rate of one of said power drives according to adjustment of said first and third eccentrics.

2. The combination in a flying shear as set forth in claim 1, in which said first power drive is adjustable for the drive of said eccentrics at infinitely variable speed to vary the duration of each revolution of said eccentrics with varying amplitude of oscillation of said arm.

3. The combination in a flying shear as set forth in claim 1, in which said other power drive is adjustable for feeding stock to said blades at infinitely variable rate, whereby the feed rate of stock may be varied with varying amplitude of oscillation of said arm.

4. In a flying shear, the combination with a shear frame and gate carrying companion shear blades, respectively, of which said frame is guided for rectilinear movement in a plane and said gate is guided on said frame for movement with its blade into and from shearing relation with the other blade, an arm having with said frame a pivot connection floatable substantially normal to said plane, and three turntable eccentrics of which a first eccentric turnably supports said arm, a second eccentric has a follower strap pivotally connected with said gate, and a third eccentric has a follower strap pivotally connected with said arm remote from said first eccentric, of a first power drive including driven members turnable with said eccentrics, respectively, for driving the latter at a one-to-one ratio and said first and third eccentrics in the same direction; clutch means between said first and third eccentrics and respective driven members for their disengagement from and reengagement with each other to permit angular adjustment of the disengaged eccentrics relative to each other and to said second eccentric into different relative positions in which, on their reengagement with the respective driven members and power drive, the combined oscillation imparted by them to said arm will be of correspondingly different amplitudes; means for feeding stock to said blades; another power drive for said feeding means; and means for varying the speed rate of one of said power drives according to adjustment of said first and third eccentrics.

5. The combination in a flying shear as set forth in claim 4, in which midway of each arm oscillation of maximum amplitude in one direction said second eccentric is in a certain position in which it extends with its largest radius normal to and toward said plane, and said first and third eccentrics then assume a first relative position in which they extend with their largest radii normal to said plane and in opposite directions, said first and third eccentrics are adjustable in opposite directions each to a maximum extent of 90 degrees so that in said certain position of said second eccentric said first and third eccentrics may assume relative positions from said first relative position to a second relative position in which they extend with their largest radii parallel to said plane and in opposite directions.

6. The combination in a flying shear as set forth in claim 5, in which said first and third eccentrics are of identical eccentricity so that said first and third eccentrics are adjustable for arm oscillation of an amplitude which may vary between zero and maximum.

7. The combination in a flying shear as set forth in claim 4, in which said pivot connection between said gate and follower strap is another eccentric, and there is further provided means for turning said other eccentric into positions in which its eccentricity is additive to, respectively subtractive from, the eccentricity of said second eccentric at the times of cut for cut and mis-cut actions, respectively, of said blades.

8. In a flying shear, the combination with a shear frame and gate carrying companion shear blades, respectively, of which said frame is guided for rectilinear movement in a plane and said gate is guided on said frame for movement with its blade into and from shearing relation with the other blade, an arm having with said frame a pivot connection floatable substantially normal to said plane, and first, second and third shafts parallel to each other and to said plane and carrying first, second and third eccentrics, respectively, of which said first eccentric turnably supports said arm, said second eccentric has a follower strap pivotally connected with said gate, and said third eccentric has a follower strap pivotally connected with said arm remote from said first eccentric, of a first power drive shaft between and parallel to said first and third shafts; meshing gears on said shafts, respectively, so arranged that on the drive of said drive shaft the other shafts are driven at a one-to-one ratio and said first and third shafts are driven in the same direction; clutches between said first and third shafts and the respective gears thereon for disengagement of the former from and reengagement with the latter while all gears remain in mesh, thereby to permit angular adjustment of the disengaged shafts relative to each other and to the remaining shafts into different relative positions in which, on their reengagement with the respective gears and subsequent drive, said arm will be oscillated at correspondingly different amplitudes; means for feeding stock to said blades; another power drive shaft for operating said feeding means; and means for varying the speed rate of one of said drive shafts according to adjustment of said first and third shafts.

9. The combination in a flying shear as set forth in claim 8, in which said floating pivot connection between said arm and frame is formed by a link pivotally connected at its ends with said arm and frame.

10. The combination in a flying shear as set forth in claim 8, in which midway of each arm oscillation of maximum amplitude in one direction said second eccentric is in a certain position in which it extends with its largest radius normal to and toward said plane, and said first and third eccentrics then assume a first relative position in which they extend with their largest radii normal to said plane and in opposite directions, said first and third shafts are adjustable in opposite directions each to a maximum extent of 90 degrees so that in said certain position of said second eccentric said first and third eccentrics may assume relative positions from said first relative position to a second relative position in which they extend with their largest radii parallel to said plane and in opposite directions.

11. The combination in a flying shear as set forth in claim 10, in which said first and third eccentrics are of the same eccentricity so that said first and third shafts are adjustable for arm oscillation of an amplitude which may vary between zero and maximum.

12. The combination in a flying shear as set forth in claim 10, in which said first and third shafts carry pointers and the gears thereon carry scales graduated in like angular degrees over 90 degrees, with the scales and pointers being so coordinated that in said certain position of said second eccentric said pointers point at the opposite end graduations of the respective scales when said first and third eccentrics are in said first and second relative positions, respectively, whereby said first and third shafts may by observation of the pointers and respective scales be adjusted into positions in which their respective eccentrics will be in said first or second relative position or spaced from either to any desired equal or unequal extent when said second eccentric is in said certain position.

13. The combination in a flying shear as set forth in claim 12, in which the opposite end graduations of said scales are differently marked to denote the positions of said first and third eccentrics in said first and second relative positions, respectively.

14. The combination in a flying shear as set forth in claim 12, in which said pointers are aligned with the largest radii of the respective first and third eccentrics.

15. The combination in a flying shear as set forth in claim 12, in which said pointers are aligned with the largest radii of the respective first and third eccentrics, said second shaft has a pointer radially aligned with the largest radius of said second eccentric, and there are further provided first, second and third fixed marks adjacent said first, second and third shafts, with said pointers on said first, second and third shafts pointing at said first, second and third marks, respectively, when in said certain position of said second eccentric said first and third eccentrics are in said first relative position.

16. The combination in a flying shear as set forth in claim 12, in which said clutches have companion parts on said first and third shafts and in the rear of the gears thereon, respectively, and said first and third shafts have shank extensions through the respective gears to the front thereof at which to adjust said first and third shafts.

17. The combination in a flying shear as set forth in claim 16, in which the gears on said first and third shafts are normally spring-urged into clutch-disengaged positions, and there are means on said shank extensions in front of the respective gears releasably to lock the latter in clutch-engaged positions.

18. In a flying shear, the combination with a shear frame and gate carrying companion shear blades, respectively, of which said gate is guided on said frame for movement of its blade into and from shearing relation with the other blade and stock therebetween in a rectilinear feed path, and three turntable eccentrics of which a first eccentric turnably supports said frame, a second eccentric is turnable coaxially of said first eccentric and has a follower strap pivotally connected with said gate, and a third eccentric has a follower strap pivotally connected with said frame remote from said first eccentric, of a first power drive including driven members turnable with said eccentrics, respectively, for driving the latter at a one-to-one ratio and said first and third eccentrics in the same direction; clutch means between said first and third eccentrics and respective driven members for their disengagement from and reengagement with each other to permit angular adjustment of the disengaged eccentrics relative to each other and to said second eccentric into different relative positions in which, on their reengagement with the respective driven members and power drive, the combined oscillation imparted by them to said frame will be of correspondingly different amplitudes; means for feeding stock to said blades; another power drive for said feeding means; and means for varying the speed rate of one of said power drives according to adjustment of said first and third eccentrics.

19. The combination in a flying shear as set forth in claim 18, in which midway of each frame oscillation of maximum amplitude in one direction said second eccentric is in a certain position in which it extends with its largest radius normal to and toward said path, and said first and third eccentrics then assume a first relative position in which they extend with their largest radii normal to said path and in opposite directions, said first and third eccentrics are adjustable in opposite directions each to a maximum extent of 90 degrees so that in said certain position of said second eccentric said first and third eccentrics may assume relative positions from said first relative position to a second relative position in which they extend with their largest radii parallel to said path and in opposite directions.

20. The combination in a flying shear as set forth in claim 19, in which said first and third eccentrics are of identical eccentricity so that said first and third eccentrics are adjustable for frame oscillation of an amplitude which may vary between zero and maximum.

References Cited by the Examiner
UNITED STATES PATENTS

| | | | |
|---|---|---|---|
| 2,734,570 | 2/1956 | Hallden | 83—305 |
| 2,843,202 | 7/1958 | Hallden | 83—299 |

ANDREW R. JUHASZ, *Primary Examiner.*

Disclaimer 3,309,953.—*Jackson Eng*, Sarnia, Ontario, Canada. SELECTIVE CONVERSION OF NORMAL PARAFFINS WITH A CRYSTALLINE ZEOLITE. Patent dated June 19, 1962. Disclaimer filed Mar. 22, 1974, by the assignee, *Esso Research and Engineering Company*.

Hereby enters the disclaimer to claims 2 and 6 of said patent.

[*Official Gazette April 29, 1975.*]